United States Patent
Singh et al.

(10) Patent No.: US 11,086,455 B2
(45) Date of Patent: Aug. 10, 2021

(54) AUTO-TUNABLE DRIVE SYSTEM FOR HIGH EFFICIENCY SYNCHRONIZED CHARGE PUMP FOR USE WITH TOUCH SCREEN SYSTEM

(71) Applicant: STMicroelectronics Asia Pacific Pte Ltd, Singapore (SG)

(72) Inventors: Abhishek Singh, Edinburgh (GB); Hugo Gicquel, Grenoble (FR)

(73) Assignee: STMicroelectronics Asia Pacific Pte Ltd, Singapore (SG)

( * ) Notice: Subject to any disclaimer, the term of this patent is extended or adjusted under 35 U.S.C. 154(b) by 0 days.

(21) Appl. No.: 16/675,950

(22) Filed: Nov. 6, 2019

(65) Prior Publication Data
US 2020/0174597 A1 Jun. 4, 2020

Related U.S. Application Data

(60) Provisional application No. 62/773,261, filed on Nov. 30, 2018.

(51) Int. Cl.
*G06F 3/044* (2006.01)
*H02M 3/07* (2006.01)

(52) U.S. Cl.
CPC .............. *G06F 3/044* (2013.01); *H02M 3/07* (2013.01)

(58) Field of Classification Search
CPC ....... G06F 3/041; G06F 3/0418–04186; G06F 3/044; G06F 3/0443–0446; G06F 3/047; G09G 3/296; G09G 3/3266–3291; G09G 3/3674–3696; G09G 2310/0264–0278; G09G 2330/02; G09G 2330/021; G09G 2330/026; G09G 2330/028; H02M 3/06; H02M 3/07; H02M 3/073; H02M 3/10; H02M 3/145; H02M 3/156; H02M 3/1563; H02M 3/157–1584; H02M 3/1588; H02M 2003/071; H02M 2003/072; H02M 2003/075–078; H02M 2003/1552–1557; H02M 2003/1566; H02M 2003/1586
See application file for complete search history.

(56) References Cited

U.S. PATENT DOCUMENTS

| 7,142,039 | B2 * | 11/2006 | Cheung | H02M 3/073 |
| | | | | 327/536 |
| 2011/0115549 | A1 * | 5/2011 | Cook | H02M 3/07 |
| | | | | 327/536 |
| 2014/0192011 | A1 * | 7/2014 | Min | G06F 3/0445 |
| | | | | 345/174 |

(Continued)

*Primary Examiner* — Nathan Danielsen
(74) *Attorney, Agent, or Firm* — Crowe & Dunlevy (57) ABSTRACT

Disclosed herein is a circuit including a driver circuit applying a received drive signal to a capacitive sensing line of a capacitive touch panel as a boosted drive signal, the driver circuit powered by a boosted supply voltage. A charge pump circuit receives an input supply voltage and output the boosted supply voltage, the charge pump circuit including a voltage sensing circuit to sense the boosted supply voltage and a comparison circuit to compare the sensed boosted supply voltage to a threshold and produce a comparison signal. A control circuit determines a ratio of a pulse width of the comparison signal to the drive signal, and tunes operation of the charge pump circuit to drive the ratio to match a performance threshold.

30 Claims, 6 Drawing Sheets

(56) References Cited

U.S. PATENT DOCUMENTS

2014/0340122 A1* 11/2014 Savanth ............... H02M 3/157
  327/50
2016/0148570 A1* 5/2016 Lee ..................... G09G 3/3258
  345/211
2018/0046309 A1* 2/2018 Singh ................... G06F 3/0445

* cited by examiner

AUTO-TUNABLE DRIVE SYSTEM FOR HIGH EFFICIENCY SYNCHRONIZED CHARGE PUMP FOR USE WITH TOUCH SCREEN SYSTEM

RELATED CASE

This application claims priority from U.S. Provisional Application For Patent No. 62/773,261, filed Nov. 30, 2018, the contents of which are incorporated by reference in their entirety.

TECHNICAL FIELD

This application relates to a capacitive touch screen system and, in particular, to the autonomous configuration of a charge pump circuit powering driver circuits that generate touch screen drive signals.

BACKGROUND

Touch screen devices are prevalent in today's computing environment. Portable computers, desktop computers, tablets, smart phones, and smartwatches typically employ a touch screen to gain user input for navigation and control of these devices. Thus, discerning the intent of the user via touch inputs is an important feature of a touch screen device.

Touch screens typically operate based on capacitive touch sensing, and include a patterned array of conductive features. For instance, the patterned array of conductive features may include sets of lines, conductive pads, overlapping structures, interleaved structures, diamond structures, lattice structures, and the like. By evaluating changes in capacitance at different lines or sets of lines, a user touch or hover, such as by a finger or stylus, can be detected.

Two common capacitive touch sensing techniques or modes that may be performed on touch screens are mutual capacitance sensing and self capacitance sensing. In a self capacitance sensing mode, a drive signal is applied to every line, regardless of orientation. Bringing a finger or conductive stylus near the surface of the touch screen changes the local electric field, increasing the capacitance between the drive line or sense line of interest and ground (the "self capacitance") in this instance. However, since all lines are driven, the capacitance change can only be measured on a per line basis as opposed to a per capacitive node basis. Therefore, the output of self capacitance sensing is two one dimensional arrays of values, with one value for each line.

As can be appreciated, the signal to noise ratio when measuring an entire line is high, and therefore self capacitance sensing allows for precise measurements. However, a primary drawback with self capacitance sensing is an inability to resolve touches by more than a single finger accurately.

In a mutual capacitance sensing mode, a drive signal is applied to a subset of the lines referred to as drive lines, and capacitance values are measured at a subset of the lines referred to as sense lines, with it being understood that the sense lines cross the drive lines in a spaced apart fashion therefrom. Each crossing of drive line and sense line forms a capacitive node. Since bringing a finger or conductive stylus near the surface of the touch screen changes the local electric field, this causes a reduction in the capacitance between the drive lines and the sense lines (the "mutual" capacitance), and the capacitance change at every individual capacitive node can be measured to accurately determine the touch location. Therefore, the output of mutual capacitance sensing is a two-dimensional matrix of values, with one value for each capacitive node (crossing between drive line and sense line). Thus, it can be appreciated that mutual capacitance sensing allows multi-touch operation where multiple fingers or styli can be accurately tracked at the same time. For this reason, mutual capacitance sensing is widely used.

However, mutual capacitance sensing is not without its own drawbacks. For example, the signal to noise ratio when measuring a single capacitive node is low. This makes noise reduction of particular interest to mutual capacitance sensing implementations.

One way to decrease the signal to noise ratio is to use a charge pump to supply the drive circuit that generates the drive signal. However, typical charge pumps used to supply drive circuits still require improvement. For example, such charge pumps can only be programmed or configured manually. Therefore, further development is needed.

SUMMARY

Disclosed herein is a circuit including a driver circuit configured to apply a received drive signal (such as an alternating current (AC) drive signal, with it being understood that other types of drive signals may be used) to a capacitive sensing line of a capacitive touch panel as a boosted drive signal, the driver circuit powered by a boosted supply voltage. A charge pump circuit is configured to receive an input supply voltage and output the boosted supply voltage, the charge pump circuit including a voltage sensing circuit configured to sense the boosted supply voltage and a comparison circuit configured to compare the sensed boosted supply voltage to a threshold and produce a comparison signal. A control circuit is configured to determine a ratio of a pulse width of the comparison signal to the drive signal, and tune operation of the charge pump circuit to drive the ratio to match a performance threshold.

The control circuit may include a counter circuit configured to determine the ratio of the pulse width of the comparison signal to the drive signal, and a state machine configured to generate a drive tuning signal for the charge pump circuit based upon the ratio.

The charge pump circuit may include a flyback capacitor and a first array of parallel connected transistors coupled to the flyback capacitor, and the control circuit may tune operation of the charge pump circuit by selecting a number of the first array of parallel connected transistors that are switchable in response to corresponding first control signals, with unselected ones of the first array of parallel connected transistors remaining switched off. Switching of the first control signals may occur synchronous to assertion of the drive signal.

The control circuit may tune the operation of the charge pump circuit by selecting the number of the first array of parallel connected transistors that are switchable in response to the corresponding first control signals, during normal operation of the circuit.

The charge pump circuit may include a second array of parallel connected transistors coupled to the flyback capacitor, and the control circuit may tune the operation of the charge pump circuit, during startup, by selecting a number of the second array of parallel connected transistors that are switchable in response to corresponding second control signals, with unselected ones of the second array of parallel connected transistors remaining switched off. Switching of the second control signals may occur synchronous to assertion of the drive signal.

The control circuit may also tune the operation of the charge pump circuit, during startup, by selecting the number of the first array of parallel connected transistors that are switchable in response to the corresponding first control signals.

Also disclosed herein is a circuit including a driver circuit configured to apply a received drive signal (such as, but not limited to, an alternating current (AC) drive signal) to a capacitive sensing line of a capacitive touch panel as a boosted drive signal, the driver circuit powered by a boosted supply voltage. A charge pump circuit is configured to receive an input supply voltage and output the boosted supply voltage so as to perform a voltage boosting operation, the charge pump circuit including a voltage sensing circuit configured to sense the boosted supply voltage and a comparison circuit configured to compare the sensed boosted supply voltage to a threshold and produce a comparison signal. A control circuit is configured to determine a ratio of the comparison signal to the drive signal, and to adapt the voltage boosting operation to a capacitive load of the capacitive touch panel by tuning a charge transfer time of the charge pump circuit based upon the ratio.

The control circuit may tune the charge transfer time of the charge pump circuit such that the ratio matches a desired ratio.

The control circuit may include a counter circuit configured to determine the ratio of the drive signal to the comparison signal, and a state machine configured to generate a drive tuning signal for the charge pump circuit based upon the ratio.

The charge pump circuit may also include a flyback capacitor and a first array of parallel connected transistors coupled to the flyback capacitor, and the control circuit may tune the charge transfer time of the charge pump circuit by selecting a number of the first array of parallel connected transistors that are switchable in response to corresponding first control signals, with unselected ones of the first array of parallel connected transistors remaining switched off. Switching of the first control signals may occur synchronous to assertion of the drive signal.

The control circuit may tune the charge transfer time of the charge pump circuit, during normal operation, by selecting the number of the first array of parallel connected transistors that are switchable in response to the corresponding first control signals.

The charge pump circuit may include a second array of parallel connected transistors coupled to the flyback capacitor, and the control circuit may tune the charge transfer time of the charge pump circuit, during startup, by selecting a number of the second array of parallel connected transistors that are switchable in response to corresponding second control signals, with unselected ones of the second array of parallel connected transistors remaining switched off. Switching of the second control signals may occur synchronous to assertion of the drive signal.

The control circuit may also tune the charge transfer time of the charge pump circuit, during startup, by selecting the number of the first array of parallel connected transistors that are switchable in response to the corresponding first control signals.

Also disclosed herein is a method including powering a driver circuit using a boosted supply voltage, applying a drive signal (such as, but not limited to, an alternating current (AC) drive signal) from the driver circuit to a capacitive sensing line of a capacitive touch panel as a boosted drive signal, comparing the sensed boosted supply voltage to a threshold and produce a comparison signal, determining a ratio of a pulse width of the comparison signal to the drive signal, and tuning operation of a charge pump circuit producing the boosted supply voltage to drive the ratio to match a performance threshold.

Operation of the charge pump circuit may be tuned by selecting a number of a first array of parallel connected transistors that are switchable in response to corresponding first control signals, with unselected ones of the first array of parallel connected transistors remaining switched off.

Operation of the charge pump circuit, during normal operation, may be tuned by selecting the number of the first array of parallel connected transistors that are switchable in response to the corresponding first control signals.

Operation of the charge pump circuit may be tuned, during startup, by selecting a number of a second array of parallel connected transistors that are switchable in response to corresponding second control signals, with unselected ones of the second array of parallel connected transistors remaining switched off.

DETAILED DESCRIPTION

Figure 1:
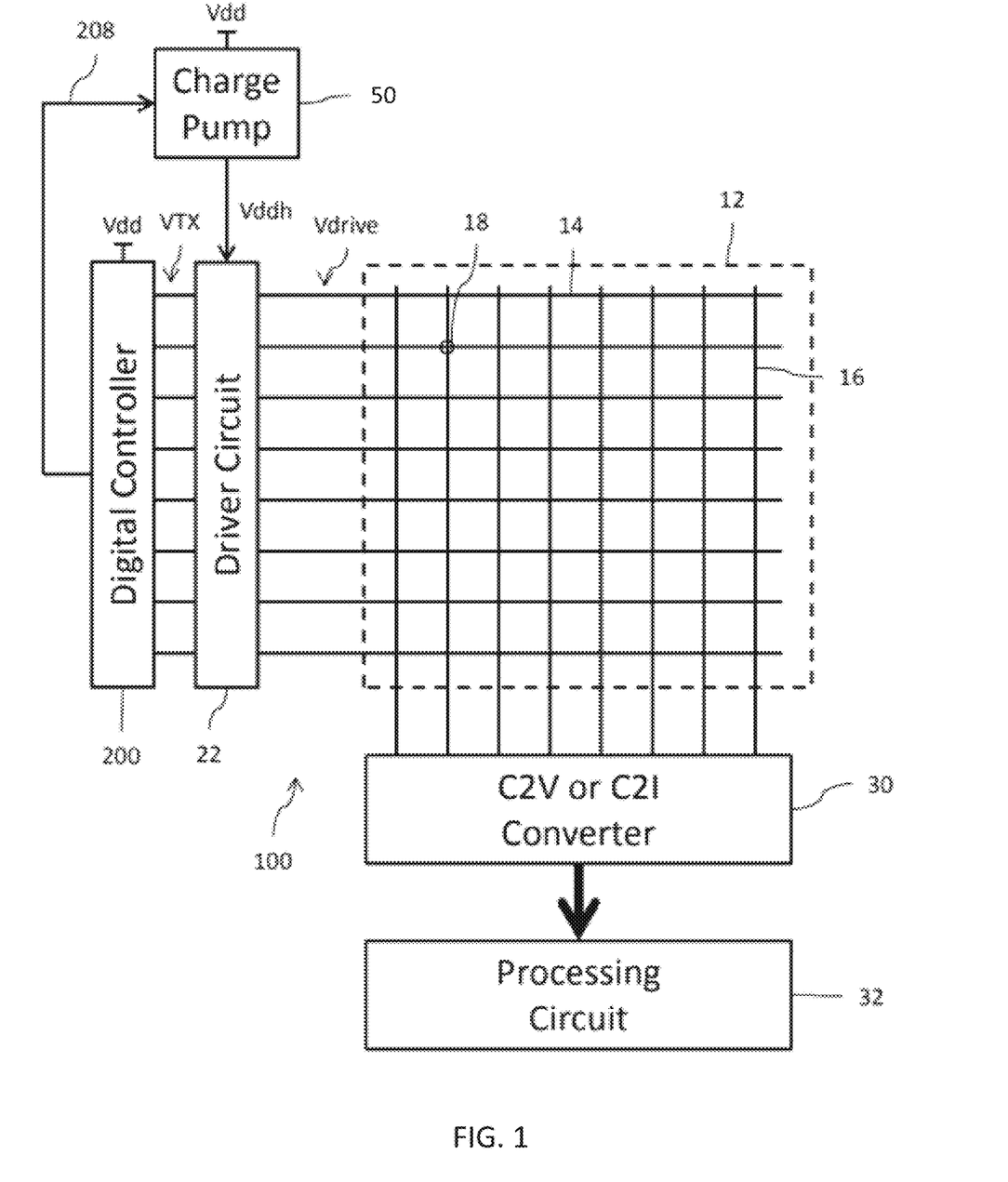
FIG. 1 is a configuration for a touch screen system configured for operation in mutual-capacitance mode with a synchronized charge pump.

Reference is now made to FIG. 1 showing a configuration for a touch screen system 100. The system 100 includes a touch panel 12 formed by a plurality of parallel drive lines 14 and a plurality of parallel sense lines 16. The drive lines 14 and sense lines 16 are typically formed of a transparent material (such as, for example, indium tin oxide ITO) so as to not obscure a visual display system (not shown) positioned underneath the panel 12. The drive lines 14 and sense lines 16 can, for example, each be formed of a plurality of series connected diamond shapes. The drive lines 14 extend across the panel 12 with a first orientation direction (for example, horizontal) and the sense lines extend across the panel 12 with a second orientation direction (for example, vertical) such that the lines 14 cross over the lines 16 (or vice versa). However, the plane containing the lines 14 and the plane containing the lines 16 are separated from each other by a layer of dielectric material. A sense capacitor 18 is accordingly formed at each location where the lines 14 and 16 cross.

A digital controller circuit 200 generates a drive signal (VTX), which is shown as an alternating current (AC) drive signal in the form of a square wave, with it being understood that other types of drive signals may be used. The digital controller 200 sequentially applies the drive signal to the drive lines 14 through a driver circuit 22. The drive signal has a frequency fd that is, for example, in the range of 100-300 kHz and is typically at 200 kHz.

The digital controller circuit 200 is powered from a power supply voltage Vdd, with Vdd typically at 3.3V. The driver circuit 22, however, is powered from a power supply voltage Vddh, where Vddh>Vdd, with Vddh for example at 6V, 9V, 12V, 16V or higher as needed. A charge pump circuit 50, powered from the power supply voltage Vdd, operates to boost the Vdd voltage to produce the Vddh voltage. The digital controller circuit 200 supplies a control signal 208, such as an AC control signal, to the charge pump circuit 50 to control the boost switching operation that generates the Vddh voltage. The control signal 208 has a frequency fo that is, for example, the same frequency fd as the drive signal. In an embodiment, the control signal 208 and the drive signal are phase aligned.

The driver circuit 22 includes a level shifting and buffering circuit to level shift the drive signal output from the digital controller circuit 200 from the Vdd voltage level to the Vddh voltage level to generate the level-shifted drive signal (Vdrive), such as but not limited to AC drive signal for application to the drive lines 14.

A conversion circuit 30 such as a charge to voltage (C2V) converter circuit (or a charge to current (C2I) converter circuit) is coupled to the sense lines 16. The conversion circuit 30 senses the charge at each sense capacitor 18 and converts the sensed charge to an output signal (voltage or current) indicative of the sensed charge. The amount of charge at each sense capacitor 18 is a function of the drive signal, the capacitance between the drive line 14 and sense line 16 at the sense capacitor 18 and the influence of a touch capacitance contributed by the presence of an object (such as a finger or stylus) in proximity to the drive lines 14 and sense lines 16 of the panel 12. A processing circuit 32 receives the output voltages from the conversion circuit 30 for each sense capacitor 18. The output voltages are processed to determine the presence (touch and/or hover) of the object and the location of the object.

The touch screen system 100 is configured with the charge pump circuit 50 synchronized to the application of the drive signal to the drive lines 14 of the panel 12 and adaptive to different capacitive loads in different modes of operation (for example, mutual-capacitance sensing or self-capacitance sensing) of the panel 12. This results in a higher efficiency of the charge pump circuit 50 and a reduction in system noise in comparison to prior art systems. The principle of operation with system 100 is to take advantage of the fact that the load of the charge pump circuit 50 is not a continuously resistive load, but is instead a sample switching capacitor load. The charge pump circuit 50 is controlled for operation at a much lower operating frequency fo (that is equal to the frequency fd of the drive signal) resulting in an improvement in power consumption (with an efficiency of 85-90%). Additionally, the synchronized operation of the charge pump advantageously ensures that the voltage is well settled by the time the conversion circuit 30 senses the charge at the sense capacitor 18. At all other times, accurate regulation of the voltage output from the charge pump circuit 50 is not required.

Figure 1A:
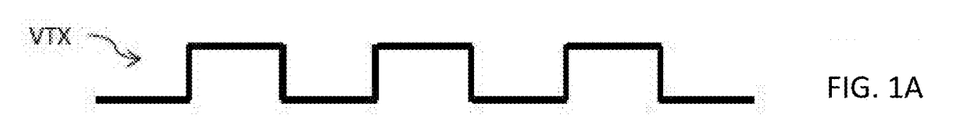
FIGS. 1A, 1B and 1C show waveforms for the AC drive signal and AC control signal.
Figure 1B:
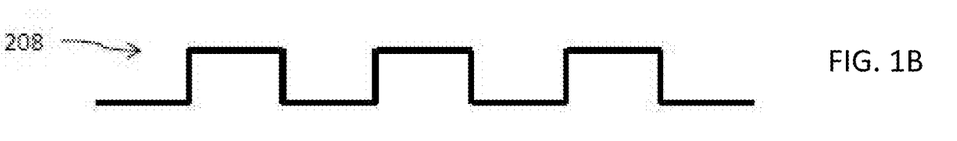
Figure 1C:
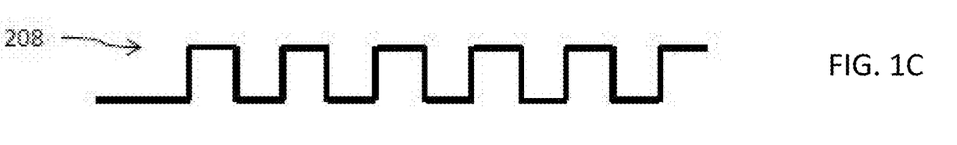

FIG. 1A shows an example of the waveform for the drive signal (VTX) generated by the digital controller circuit 200. FIG. 1B shows an example of the waveform for the control signal 208 generated by the digital controller circuit 200. These signals have a same frequency with substantially aligned phases. In an alternative embodiment, the control signal 208 may instead have a frequency that is an integer multiple of the frequency of the drive signal (VTX) with phase alignment to the drive signal VTX as shown in the example of FIG. 1C where the integer multiple is two.

Figure 2:
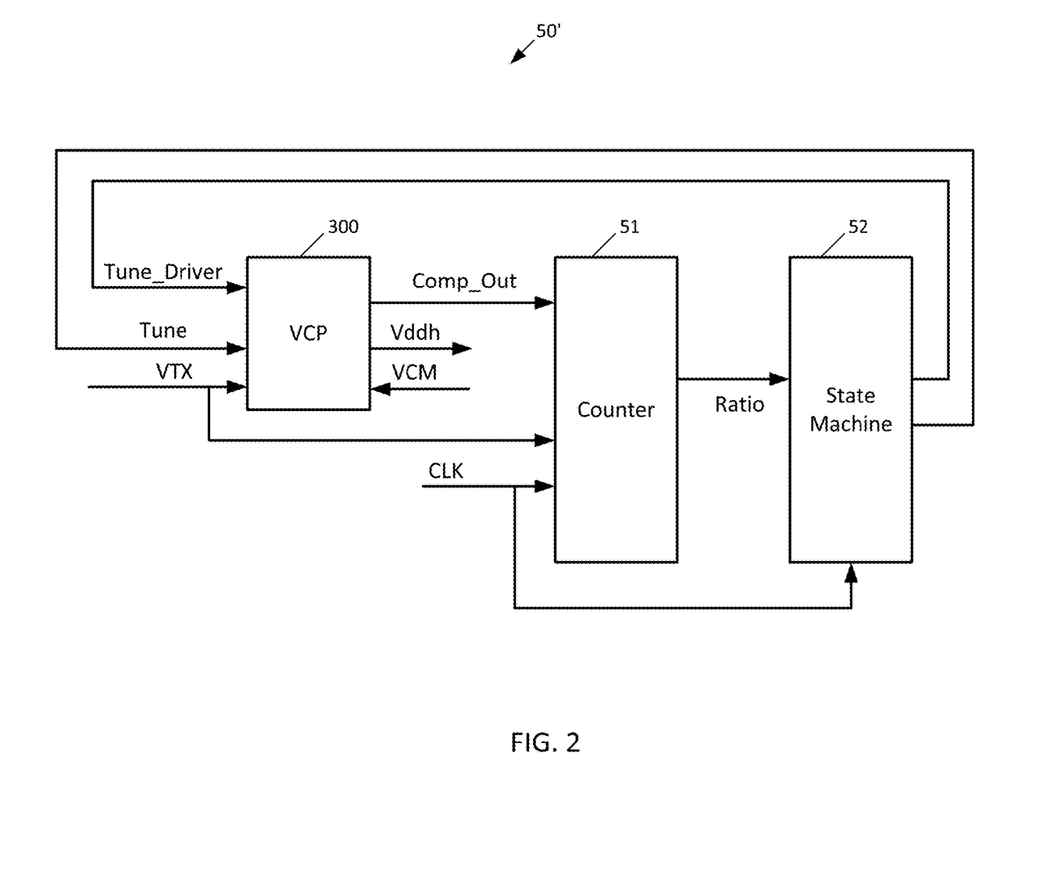
FIG. 2 is an automatically tuning charge pump circuit such as may be used with the touch screen system of FIG. 1.

While this system 100 as described provides robust performance, in some instances, it is desirable for tuning of different aspects of the charge pump circuit 50 to be automatic. Therefore, now described with reference to FIG. 2 is a charge pump circuit 50' such as may be used with the system 100 of FIG. 1.

The charge pump circuit 50' includes a charge pump voltage generation circuit 300 receiving control signals Tune_Driver and Tune, as well as the drive signal VTX. The charge pump voltage generation circuit 300 produces the Vddh voltage as well as a comparison signal Comp_Out that is a result of a comparison of the Vddh voltage to a common mode VCM, which will be described in further details below. A counter 51 receives the comparison signal Comp_Out, the drive signal VTX, and the clock signal CLK, and provides an output signal Ratio based upon those signals. A state machine 52 receives the output signal Ratio, and generates the control signal Tune_Driver based upon the output signal Ratio.

In operation, the counter determines the ratio Ratio between the comparison signal Comp_Out and the drive signal VTX by comparing the duration of a drive signal VTX pulse to a duration of the comparison signal Comp_Out pulse. The duration of each is determined by counting the number of clock cycles per drive signal VTX pulse and per comparison signal Comp_Out pulse. The state machine 52 adjusts the control signal Tune_Driver that adjusts the Vddh voltage curve until the output signal Ratio matches a desired value. It should be appreciated that different values of Tune_Driver may be needed to achieve the same output signal Ratio as conditions of the charge pump voltage generation circuit 300 change, for example due to aging and process/voltage/temperature variation. This therefore eliminates the need for excess operating margins typically built into prior art charge pump circuit designs and used to ensure that the charge pump will operate properly over changing conditions, as the operation of the charge pump voltage generation circuit 300 can be adjusted as conditions change. This serves to reduce power consumption, and allow for optimization against EMI. Also, the use of this monitoring can be used to detect faults, for example where the desired ratio is unable to be achieved.

Note that during startup, the state machine also adjusts the control signal Tune in the same fashion as described above for Tune_Driver, namely so that the output signal Ratio matches the desired value. During normal operation, the control signal Tune is left as initially set, and adjustment proceeds using Tune_Driver.

Figure 3:
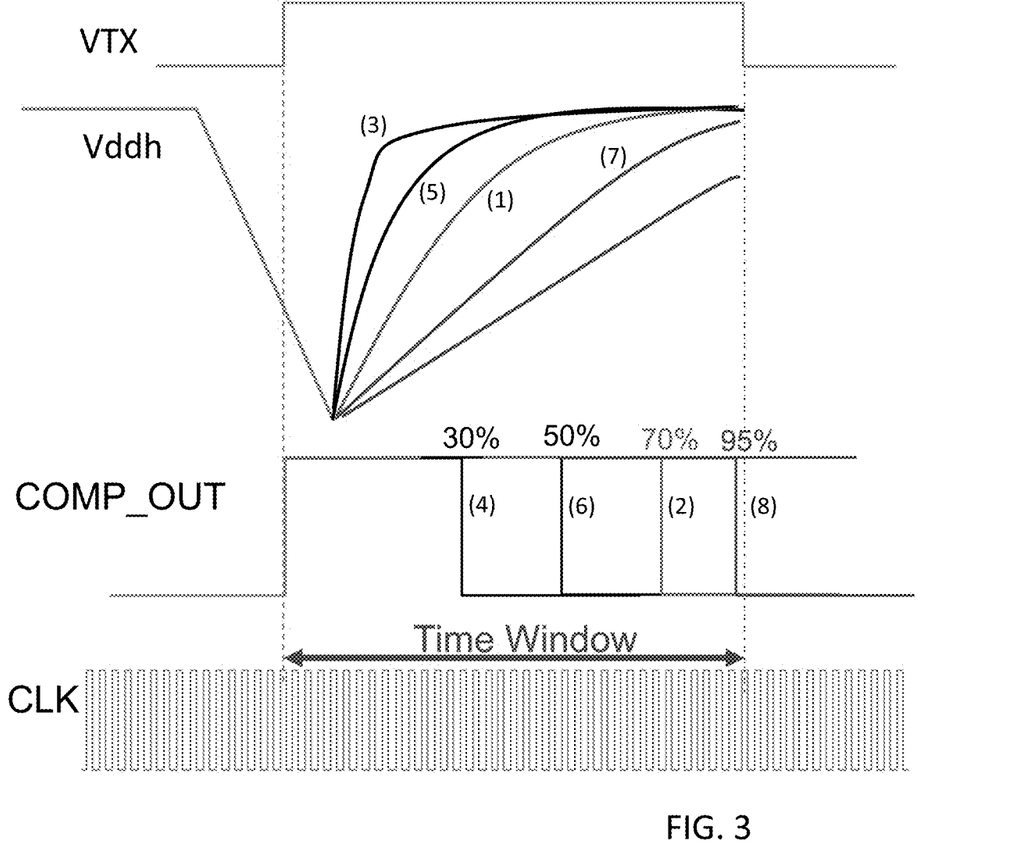
FIG. 3 is a graph showing different curves of a charge pump output voltage of FIG. 2 for different ratios of an alternating current drive signal to a comparison signal.

Example Vddh curves produced by the charge pump voltage generation circuit 300 are shown in FIG. 3. Here it can be seen that a Vddh curve 3 corresponds to a ratio of 30% between the drive signal VTX and the comparison signal Comp_Out, shown by the Comp_Out edge 4. Similarly it can be seen that a Vddh curve 5 corresponds to a ratio of 50% between the drive signal VTX and the comparison signal Comp_Out, shown by the Comp_Out edge 6. Both Vddh curves 3 and 5 are considered too fast, and could cause an EMI issue. Therefore, in this example, a ratio of 30% or 50% is not suitable. Vddh curve 7 corresponds to a ratio of 95% between the drive signal VTX and the comparison signal Comp_Out, shown by the Comp_Out edge 8. The Vddh curve 7 is considered too slow, and would not yield proper functioning. Therefore, in this example, a ratio of 95/100 is also not suitable. However, note that Vddh curve 1 corresponds to a ratio of 70% between the drive signal VTX and the comparison signal Comp_Out, shown by the Comp_Out edge 2. This ratio of 70% is the desired ratio in this example.

Figure 4:
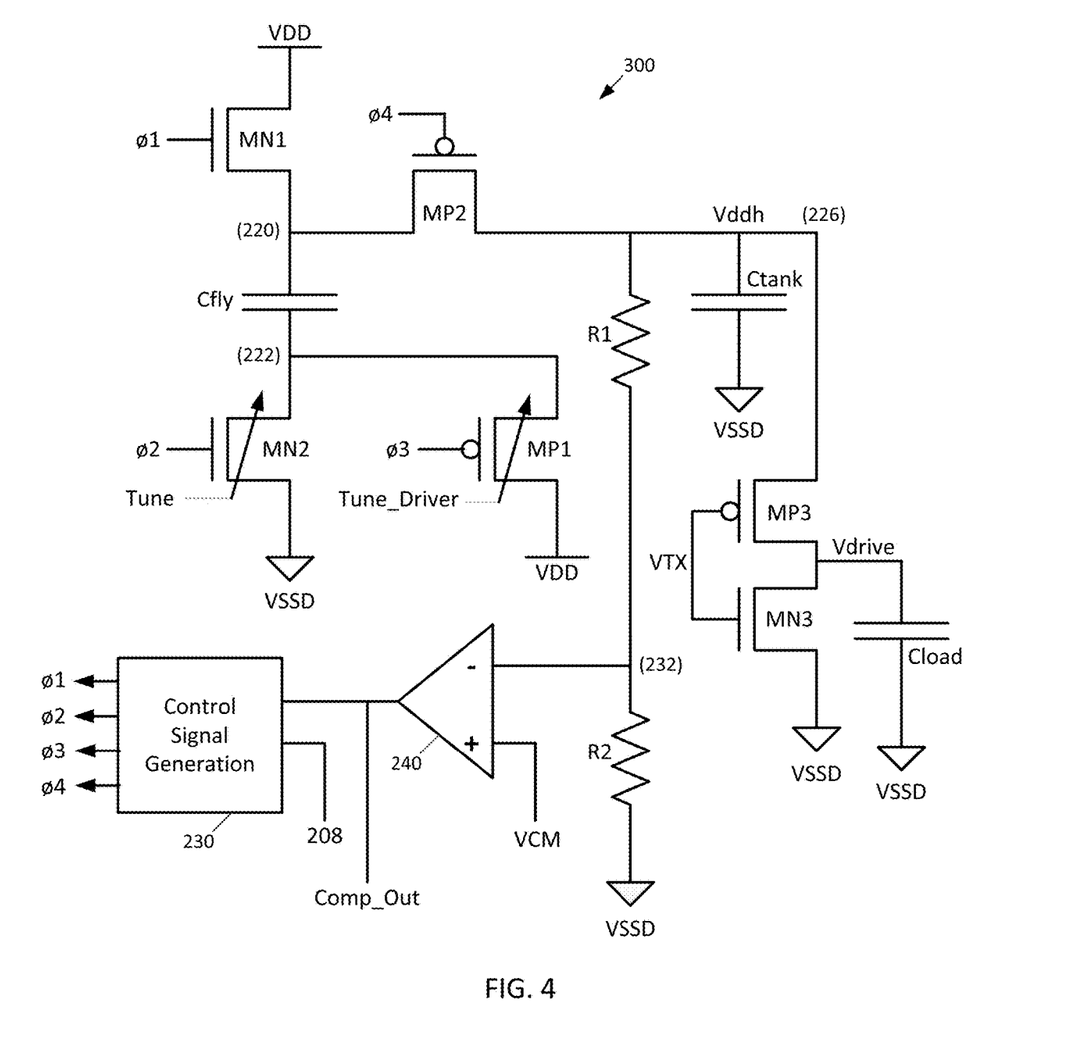
FIG. 4 is a circuit diagram of the charge pump voltage generation circuit of FIG. 2.

The charge pump voltage generation circuit 300 is now described with additional reference to FIG. 4. The charge pump voltage generation circuit 300 includes an n-channel MOS transistor MN1 having source terminal coupled to receive the input VDD voltage level and a drain terminal coupled to an intermediate node 220. The gate terminal of transistor MN1 is controlled by a first control signal ($\varphi 1$). A first plate of a flyback capacitor Cfly is coupled to the intermediate node 220. An n-channel transistor MN2 has a drain terminal coupled an intermediate node 222 and a source terminal coupled to receive the ground voltage. The gate terminal of transistor MN2 is controlled by a second control signal ($\varphi 2$). A second plate of the flyback capacitor Cfly is coupled to the intermediate node 222. A p-channel MOS transistor MP1 has a source terminal coupled to receive the input VSSD voltage level and a drain terminal coupled to the intermediate node 222. The gate terminal of transistor MP1 is controlled by a third control signal ($\varphi 3$). A p-channel MOS transistor MP2 has a drain terminal coupled to the intermediate node 220 and a source terminal coupled to an output node 226 which generates the Vddh voltage level. The gate terminal of transistor MP1 is controlled by a fourth control signal ($\varphi 4$). A first plate of an output tank capacitor Ctank is coupled to the output node 226. A second plate of an output tank capacitor Ctank is coupled to the ground voltage.

A p-channel MOS transistor MP3 has a source terminal coupled to the output node 226, a gate terminal, and a drain terminal. An n-channel MOS transistor MN3 has a drain terminal coupled to the drain terminal of transistor MP3, a source terminal coupled to receive the input VSSD voltage level, and a gate terminal coupled to the gate terminal of transistor MP3. The gate terminals of transistor MP3 and MN3 are coupled to the drive signal VTX. The level-shifted drive signal Vdrive is produced at the drains of transistor MP3, MN3, and is applied to the drive lines 14 as described above, represented by load capacitance Cload.

The n-channel transistor MN2 may comprise a tunable transistor array, meaning that transistor MN2 represents a plurality of transistors MN2 connected in parallel. The transistor MN2 has a conduction that is tuned in response to the control signal Tune from the state machine 52, which serves to turn on a desired number of the transistors MN2 so as to increase or decrease the current of the signal produced. The control signal Tune is adjustable at startup During start-up operation of the charge pump circuit 50', the control signal Tune can exercise control over the number of the transistors MN2 active, so as to reduce or avoid an excessive inrush current.

The p-channel MOS transistor MP1 may also comprise a tunable transistor array, meaning that transistor MP1 represents a plurality of transistors MNP1 connected in parallel. The transistor MP1 therefore has a conduction that is tuned in response to the control signal Tune_Driver from the state machine 52, which serves to turn on a desired number of the transistors MP1 so as to increase or decrease the current of the signal produced. Responsive to operating mode, the control signal Tune_Driver can therefore exercise control over device conduction and the Vddh curve based on the capacitive load coupled to receive the level-shifted drive signal Vdrive.

For example, the panel 12 has a relatively lower capacitive load when operating in a mutual capacitance operating mode, but has a relatively higher capacitive load when operating in a self capacitance operating mode. The charge pump circuit 50' is desired to be able to adapt to these capacitive load differences.

This is another function accomplished through control signal Tune_Driver, with adjustment of transistor MP1 conduction effectuating control over the slew-rate (transfer time) of the charge pump voltage generation circuit 300. When the panel is in the mutual capacitance operating mode, the control signal Tune_Driver tunes transistor MP1 for increased transfer time (meaning reduced conduction) so that over pumping is reduced. When the panel is in the self capacitance operating mode, the control signal Tune_Driver tunes transistor MP1 for decreased transfer time (meaning increased conduction) so that the output voltage reaches a desired value in each pump cycle. In effect, the control signal Tune_Driver adjusts the charge rate dependent on operating mode.

The control signals $\varphi 1$-$\varphi 4$ are generated by a control signal generation circuit 230. The circuit 230 may, for example, comprise a logic circuit or microcontroller circuit. The circuit 230 receives the control signal 208 generated by the digital controller circuit 200 and generates from that control signal 208 and a sensing of the Vddh voltage level the various control signals $\varphi 1$-$\varphi 4$ with appropriate timings of edges to control switching of the transistors MN1, MN2, MP1 and MP2 to effectuate boosting of the input Vdd voltage level to generate the output Vddh voltage level.

The charge pump voltage generation circuit 300 further includes a voltage sensing circuit in the form of a resistive voltage divider comprised of series connected resistors R1 and R2 coupled between the output node 226 and the ground voltage. The intermediate node 232 of the series connected resistors R1 and R2 is a tap node outputting sensed voltage Vsense that is a fraction of the Vddh voltage level. A voltage comparator circuit 240 has an inverting input terminal coupled to the intermediate node 232 and a non-inverting input terminal coupled to receive a reference voltage VCM. The voltage comparator circuit 240 outputs a control signal Comp_Out. The reference voltage may, for example, comprise a common mode voltage for the touch screen system 10 generated by a bandgap voltage generator circuit in a manner well known to those skilled in the art. The resistive voltage divider R1/R2 and voltage comparator circuit 240 function to sense the Vddh voltage level in comparison to a threshold voltage and generate the output control signal Comp_Out indicative of that comparison. When Comp_Out is in a first logic state (for example, logic "1"), this means that the Vddh voltage level is less than the threshold voltage and the control signal generation circuit 230 is enabled for operation to generate the various control signals $\varphi 1$-$\varphi 4$ from the control signal 208. Conversely, when Comp_Out is in a second logic state (for example, logic "0"), this means that the Vddh voltage level is greater than or equal to the threshold voltage and the control signal generation circuit 230 is disabled from operation.

Figure 5:
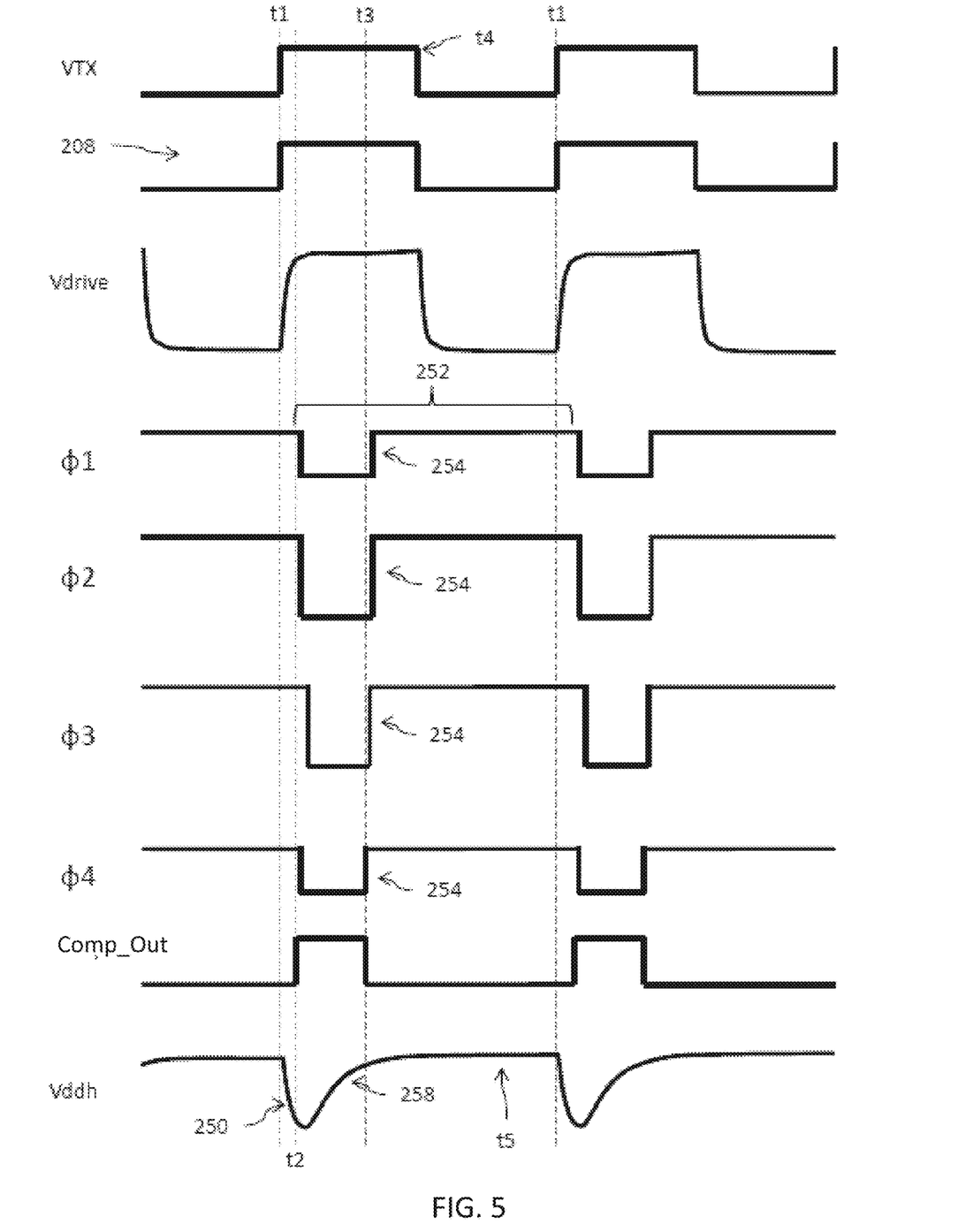
FIG. 5 shows waveforms for operation of the charge pump circuit and touch screen system.

FIG. 5 shows waveforms for operation of the charge pump circuit and touch screen system. Prior to time t1, the logic states of the control signals $\varphi 1$-$\varphi 4$ cause transistors MN1 and MN2 to be turned on (with transistors MP1 and MP2 turned off) and thus the voltage Vdd is stored across the flyback capacitor Cfly. At time t1, the digital controller circuit 200 asserts the drive signal VTX and the control signal 208 is simultaneously asserted. The driver circuit 22 receives the drive signal VTX, performs the level shifting operation and asserts the drive signal Vdrive. The level shifting and drive operation performed by the driver circuit 22 causes a drop in the Vddh voltage level (reference 250).

The voltage drop is sensed by the resistive voltage divider R1/R2 and voltage comparator circuit 240, with the output Comp_Out of the voltage comparator circuit 240 being asserted at time t2. The control signal generation circuit 230 is thus enabled for operation to generate logic state changes for the various control signals φ1-φ4 responsive to the assertion of the control signal 208. The change in logic states of the control signals φ1-φ4 near time t2 causes transistors MP1 and MP2 to be turned on (with transistors MN1 and MN2 turned off). The Vddh voltage is applied to the second plate of the flyback capacitor Cfly, and the first plate of the flyback capacitor Cfly is connected to the output node 226. Twice the Vddh voltage minus threshold voltage losses is supplied at the output node 226 and charge sharing occurs with the tank capacitor Ctank. As a result, the output voltage Vddh at the output node is boosted to recover from the voltage drop 250.

In some embodiments, only one full cycle 252 of the generation of the control signals φ1-φ4 is performed in response to the control signal 208 and the assertion of the output Comp_Out signal. In this context, one full cycle means one period such that one pulse 254 (with two edged) of each of the control signals φ1-φ4 occurs. The single full cycle is sufficient to cause the charge pump circuit 50' to boost the Vddh voltage level (reference 258).

As explained earlier, the slew-rate of the charge transfer between times t2 and t3 is controlled by the tuning of transistor MP1 using control signal Tune_Driver. At time t3, the Vddh voltage level has recovered to the point where the Vddh voltage level exceeds the threshold. The output Comp_Out of the voltage comparator circuit 240 is then deasserted. The charge pump circuit 50' is disabled and the control signal generation circuit 230 responds to the change in state of the output Comp_Out by changing the logic state of the control signals φ1-φ4. Transfer of charge from the flyback capacitor Cfly to the tank capacitor Ctank terminates because transistor MP2 is turned off. The current logic states of the control signals φ1-φ4 after time t3 accordingly cause transistors MN1 and MN2 to be turned on (with transistors MP1 and MP2 turned off) and thus the voltage Vdd is again stored across the flyback capacitor Cfly. The operation of the charge pump circuit 50' to charge the flyback capacitor Cfly, boost and then dump charge to tank capacitor Ctank is accordingly performed synchronous to the assertion of the drive signal Vdrive and responsive to sensing the voltage level of the Vddh voltage.

At time t4, the digital controller circuit 200 deasserts the drive signal VTX and the control signal 208 is simultaneously deasserted. The driver circuit 22 responds to the drive signal VTX and deasserts the drive signal Vdrive. The Vddh voltage level recovers sufficiently from the charge sharing after boosting and settles prior to the time t5 that the C2V converter circuit 30 operates to sense the charge at the sense capacitor 18 and convert the sensed charge to an output voltage indicative of the sensed charge.

Thus, in operation, the enabling of the charge pump circuit 50' for operation to apply the boosted voltage to the output node 226 occurs synchronous to the assertion of the drive signals VTX and Vdrive. The switching control signals φ1-φ4 of the charge pump circuit 50' have a same frequency as the control signal 208 (and thus a same frequency as the drive signals VTX and Vdrive).

In an example implementation, the Vdd voltage level is 3.3V, the Vddh voltage level is 6.1 V, the logic low voltage level of the control signal 208, drive signal VTX, drive signal Vdrive and Comp_Out signal is 0V, the logic high voltage level of the control signal 208, drive signal VTX and Comp_Out signal is 3.3V, the logic high voltage level of the drive signal Vdrive is 6.1V, the logic low voltage level of the switching control signals φ2 and φ3 is 0V, the logic high voltage level of the switching control signals φ2 and φ3 is 3.3V, the logic low voltage level of the switching control signals φ1 and φ4 is 3.3V, and the logic high voltage level of the switching control signals φ1 and φ4 is 6.1V. It is accordingly noted that the switching control signals φ1 and φ4 are boostrapped signals generated by the control signal generation circuit 230.

With reference to the waveforms for the control signals φ1-φ4, it will be noted that the edges of the signals are not aligned. This is purposeful in order to ensure that the control signals are not overlapping.

While the disclosure has been described with respect to a limited number of embodiments, those skilled in the art, having benefit of this disclosure, will appreciate that other embodiments can be envisioned that do not depart from the scope of the disclosure as disclosed herein. Accordingly, the scope of the disclosure shall be limited only by the attached claims.

The invention claimed is:

1. A circuit, comprising:
   a driver circuit configured to apply a received drive signal to a capacitive sensing line of a capacitive touch panel as a boosted drive signal, the driver circuit powered by a boosted supply voltage;
   a charge pump circuit configured to receive an input supply voltage and output the boosted supply voltage, the charge pump circuit including a voltage sensing circuit configured to sense the boosted supply voltage and a comparison circuit configured to compare the boosted supply voltage to a threshold and produce a comparison signal;
   a control circuit configured to:
      determine a ratio of a pulse width of the comparison signal to a pulse width of the received drive signal; and
      tune operation of the charge pump circuit to drive the ratio to match a performance threshold.

2. The circuit of claim 1, wherein the received drive signal is an alternating current (AC) drive signal; and wherein the boosted drive signal is a boosted AC drive signal.

3. The circuit of claim 1, wherein the control circuit comprises:
   a counter circuit configured to determine the ratio of the pulse width of the comparison signal to the pulse width of the received drive signal; and
   a state machine configured to generate a drive tuning signal for the charge pump circuit based upon the ratio.

4. The circuit of claim 1, wherein the charge pump circuit further comprises:
   a flyback capacitor and a first array of parallel connected transistors coupled to the flyback capacitor;
   wherein the control circuit tunes operation of the charge pump circuit by selecting a number of transistors the first array of parallel connected transistors that are switchable in response to corresponding first control signals, with unselected ones of the transistors of the first array of parallel connected transistors remaining switched off; and
   wherein switching of the first control signals occur synchronous to assertion of the boosted drive signal.

5. The circuit of claim 4, wherein the control circuit tunes the operation of the charge pump circuit by selecting the number of the transistors of the first array of parallel connected transistors that are switchable in response to the corresponding first control signals, during normal operation of the circuit.

6. The circuit of claim 5, wherein the charge pump circuit further comprises:
a second array of parallel connected transistors coupled to the flyback capacitor;
wherein the control circuit tunes the operation of the charge pump circuit, during startup, by selecting a number of the transistors of the second array of parallel connected transistors that are switchable in response to corresponding second control signals, with unselected ones of the transistors of the second array of parallel connected transistors remaining switched off; and
wherein switching of the second control signals occur synchronous to assertion of the boosted drive signal.

7. The circuit of claim 5, wherein the control circuit also tunes the operation of the charge pump circuit, during startup, by selecting the number of the transistors of the first array of parallel connected transistors that are switchable in response to the corresponding first control signals.

8. A circuit, comprising:
a driver circuit configured to apply a received drive signal to a capacitive sensing line of a capacitive touch panel as a boosted drive signal, the driver circuit powered by a boosted supply voltage;
a charge pump circuit configured to receive an input supply voltage and output the boosted supply voltage so as to perform a voltage boosting operation, the charge pump circuit including a voltage sensing circuit configured to sense the boosted supply voltage and a comparison circuit configured to compare the boosted supply voltage to a threshold and produce a comparison signal;
a control circuit configured to:
determine a ratio of the comparison signal to the received drive signal; and
adapt the voltage boosting operation to a capacitive load of the capacitive touch panel by tuning a charge transfer time of the charge pump circuit based upon the ratio.

9. The circuit of claim 8, wherein the received drive signal is an alternating current (AC) drive signal; and wherein the boosted drive signal is a boosted AC drive signal.

10. The circuit of claim 8, wherein the control circuit tunes the charge transfer time of the charge pump circuit such that the ratio matches a desired ratio.

11. The circuit of claim 8, wherein the control circuit comprises:
a counter circuit configured to determine the ratio of the received drive signal to the comparison signal; and
a state machine configured to generate a drive tuning signal for the charge pump circuit based upon the ratio.

12. The circuit of claim 8, wherein the charge pump circuit further comprises:
a flyback capacitor and a first array of parallel connected transistors coupled to the flyback capacitor;
wherein the control circuit tunes the charge transfer time of the charge pump circuit by selecting a number of the transistors of the first array of parallel connected transistors that are switchable in response to corresponding first control signals, with unselected ones of the transistors of the first array of parallel connected transistors remaining switched off; and
wherein switching of the first control signals occur synchronous to assertion of the boosted drive signal.

13. The circuit of claim 12, wherein the control circuit tunes the charge transfer time of the charge pump circuit, during normal operation, by selecting the number of the transistors of the first array of parallel connected transistors that are switchable in response to the corresponding first control signals.

14. The circuit of claim 12, wherein the charge pump circuit further comprises:
a second array of parallel connected transistors coupled to the flyback capacitor;
wherein the control circuit tunes the charge transfer time of the charge pump circuit, during startup, by selecting a number of transistors of the second array of parallel connected transistors that are switchable in response to corresponding second control signals, with unselected ones of the transistors of the second array of parallel connected transistors remaining switched off; and
wherein switching of the second control signals occur synchronous to assertion of the boosted drive signal.

15. The circuit of claim 12, wherein the control circuit also tunes the charge transfer time of the charge pump circuit, during startup, by selecting the number of the transistors of the first array of parallel connected transistors that are switchable in response to the corresponding first control signals.

16. A method, comprising:
powering a driver circuit using a boosted supply voltage;
applying a drive signal from the driver circuit to a capacitive sensing line of a capacitive touch panel as a boosted drive signal;
comparing the boosted supply voltage to a threshold and produce a comparison signal;
determining a ratio of a pulse width of the comparison signal to a pulse width of the drive signal; and
tuning operation of a charge pump circuit producing the boosted supply voltage to drive the ratio to match a performance threshold.

17. The method of claim 16, wherein the drive signal is an alternating current (AC) drive signal; and wherein the boosted drive signal is a boosted AC drive signal.

18. The method of claim 16, wherein operation of the charge pump circuit is tuned by selecting a number of transistors of a first array of parallel connected transistors that are switchable in response to corresponding first control signals, with unselected ones of the transistors of the first array of parallel connected transistors remaining switched off.

19. The method of claim 18, wherein operation of the charge pump circuit, during normal operation, is tuned by selecting the number of the transistors of the first array of parallel connected transistors that are switchable in response to the corresponding first control signals.

20. The method of claim 19, wherein operation of the charge pump circuit is tuned, during startup, by selecting a number of transistors of a second array of parallel connected transistors that are switchable in response to corresponding second control signals, with unselected ones of the transistors of the second array of parallel connected transistors remaining switched off.

21. A circuit, comprising:
a driver circuit configured to apply a received drive signal to a capacitive sensing line of a capacitive touch panel as a boosted drive signal, the driver circuit powered by a boosted supply voltage;
a charge pump circuit configured to receive an input supply voltage and output the boosted supply voltage; and a control circuit configured to tune operation of the charge pump circuit based upon the boosted supply voltage, a threshold, and the received drive signal.

22. The circuit of claim 21, wherein the control circuit tunes operation of the charge pump circuit based upon a comparison between the boosted supply voltage to the threshold, as well as based upon the received drive signal.

23. The circuit of claim 22, wherein the control circuit compares the boosted supply voltage to the threshold to produce a comparison signal; and wherein the control circuit tunes operation of the charge pump circuit based upon a ratio of a pulse width of the comparison signal to a pulse width of the boosted drive signal.

24. The circuit of claim 21, wherein the received drive signal is an alternating current (AC) drive signal; and wherein the boosted drive signal is a boosted AC drive signal.

25. The circuit of claim 23, wherein the control circuit comprises:
a counter circuit configured to determine a ratio of the pulse width of the comparison signal to the pulse width of the boosted drive signal; and
a control circuit configured to generate a drive tuning signal for the charge pump circuit based upon the ratio.

26. The circuit of claim 21, wherein the charge pump circuit further comprises:
a first array of parallel connected transistors coupled to a flyback capacitor;
wherein the control circuit tunes operation of the charge pump circuit by selecting a number of the transistors of the first array of parallel connected transistors that are switchable in response to corresponding first control signals; and
wherein switching of the first control signals occur synchronously with the boosted drive signal.

27. A method, comprising:
powering a driver circuit using a boosted supply voltage;
applying a drive signal from the driver circuit to a capacitive sensing line of a capacitive touch panel as a boosted drive signal;
comparing the boosted supply voltage to a threshold and produce a comparison signal; and
tuning operation of a charge pump circuit producing the boosted supply voltage based upon a ratio of a pulse width of the comparison signal to a pulse width of the drive signal.

28. The method of claim 27, wherein operation of the charge pump circuit is tuned by selecting a number of transistors of a first array of parallel connected transistors that are switchable in response to corresponding first control signals.

29. The method of claim 28, wherein operation of the charge pump circuit, during normal operation, is tuned by selecting the number of the transistors of the first array of parallel connected transistors that are switchable in response to the corresponding first control signals.

30. The method of claim 29, wherein operation of the charge pump circuit is tuned, during startup, by selecting a number of transistors of a second array of parallel connected transistors that are switchable in response to corresponding second control signals.

* * * * *